(12) United States Patent
Park et al.

(10) Patent No.: US 6,590,006 B2
(45) Date of Patent: Jul. 8, 2003

(54) MACROCELLULAR POLYOLEFIN FOAM HAVING A HIGH SERVICE TEMPERATURE FOR ACOUSTICAL APPLICATIONS

(75) Inventors: Chung P. Park, Baden-Baden (DE); Suresh Subramonian, Midland, MI (US); Sandrine Burgun, Drusenheim (FR)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/782,231

(22) Filed: Feb. 13, 2001

(65) Prior Publication Data

US 2001/0036975 A1 Nov. 1, 2001

Related U.S. Application Data

(60) Provisional application No. 60/190,714, filed on Mar. 17, 2000, and provisional application No. 60/202,364, filed on May 5, 2000.

(51) Int. Cl.[7] .................................................. C08J 9/36
(52) U.S. Cl. ......................................... 521/134; 521/81
(58) Field of Search ...................... 521/81, 134; 264/50

(56) References Cited

U.S. PATENT DOCUMENTS

| | | | |
|---|---|---|---|
| 3,239,585 A | 3/1966 | Karpovich et al. | 264/84 |
| 3,386,877 A | 6/1968 | Skochdopole et al. | 161/160 |
| 4,154,785 A | 5/1979 | Inui et al. | 264/45.5 |
| 4,229,396 A | 10/1980 | Suh et al. | 264/53 |
| 4,423,101 A | 12/1983 | Willstead | 428/76 |
| 4,424,293 A * | 1/1984 | Nojiri et al. | 521/140 |
| 4,435,346 A | 3/1984 | Ito et al. | 264/54 |
| 4,522,955 A * | 6/1985 | Fukushima et al. | 521/79 |
| 4,548,775 A | 10/1985 | Hayashi et al. | 264/45.5 |
| 4,714,716 A | 12/1987 | Park | 521/80 |
| 4,916,198 A | 4/1990 | Scheve et al. | 526/351 |
| 5,116,881 A | 5/1992 | Park et al. | 521/143 |
| 5,180,751 A * | 1/1993 | Park et al. | 521/79 |
| 5,206,082 A | 4/1993 | Malone | 428/294 |
| 5,242,634 A | 9/1993 | Matsumoto | 264/25 |
| 5,348,795 A | 9/1994 | Park | 428/220 |
| 5,424,016 A | 6/1995 | Kolosowski | 264/156 |
| 5,527,573 A | 6/1996 | Kolosowski | 428/314.8 |
| 5,567,742 A | 10/1996 | Park | 521/143 |
| 5,585,058 A | 12/1996 | Kolosowski | 264/156 |
| 5,605,936 A | 2/1997 | DeNicola, Jr. et al. | 521/50.5 |
| 5,618,853 A | 4/1997 | Vonken et al. | 521/60 |
| 5,643,969 A | 7/1997 | Sakamoto et al. | 521/81 |
| 5,776,390 A | 7/1998 | Fiddelaers et al. | 264/50 |
| 5,801,208 A | 9/1998 | Lee | 521/98 |
| 5,817,705 A | 10/1998 | Wilkes et al. | 521/79 |
| 5,843,058 A | 12/1998 | Quist | 604/369 |
| 5,929,127 A | 7/1999 | Raetzsch et al. | 521/81 |
| 5,929,129 A | 7/1999 | Feichtinger | 521/134 |
| 6,007,890 A | 12/1999 | DeBlander | 428/72 |
| 6,030,696 A | 2/2000 | Lee | 428/220 |
| 6,207,254 B1 | 3/2001 | Lee et al. | 428/159 |
| 6,225,366 B1 | 5/2001 | Raetsch et al. | 521/134 |
| 6,251,319 B1 | 6/2001 | Tusim et al. | 264/45.9 |
| 6,284,842 B1 | 9/2001 | Ho et al. | 525/194 |

FOREIGN PATENT DOCUMENTS

| | | | |
|---|---|---|---|
| DE | 3514817 | 10/1985 | C08J/9/38 |
| EP | 190889 | 4/1993 | C08F/8/50 |
| EP | 674578 | 9/1999 | B29C/44/00 |
| JP | 5-9030871 | 2/1984 | C09D/05/12 |
| JP | 6-2273826 | 11/1987 | B29C/59/02 |
| JP | 0-2188233 | 7/1990 | B29C/67/20 |
| WO | WO 84/00901 | 3/1984 | B01D/39/00 |
| WO | WO 90/14159 | 11/1990 | B01J/20/26 |
| WO | WO 94/13460 | 6/1994 | B29C/67/22 |
| WO | WO 00/12594 | 3/2000 | C08J/9/00 |
| WO | WO 00/15700 | 3/2000 | C08J/9/00 |

* cited by examiner

*Primary Examiner*—Morton Foelak

(57) ABSTRACT

Macrocellular polyolefin foams that can withstand temperatures above 110° C. are described for use in sound absorption and insulation applications, especially in elevated temperature and/or moist environments. These foams have a large cell size ($\geq 1.5$ mm), are open or closed-cell foams, and preferably have at least one perforation per square centimeter and/or a density less than 25 kg/m³. They are obtainable by extruding a high melt strength (HMS) polypropylene resin (PP), or preferably a blend of a HMS PP resin and a free radical polymerized ethylene polymer present in the blend in a weight ratio of at least 35:65, optionally another polymer such as a substantially random interpolymer, a cell size enlarging agent such a glycerol monostearate, an antioxidant, carbon black and/or flame retardant additives, using a volatile organic compound, e.g. isobutane, as blowing agent.

33 Claims, 2 Drawing Sheets

MACROCELLULAR POLYOLEFIN FOAM HAVING A HIGH SERVICE TEMPERATURE FOR ACOUSTICAL APPLICATIONS

CROSS-REFERENCE TO RELATED APPLICATIONS

This application claims priority from U.S. Provisional Application No. 60/190,714 filed on Mar. 17, 2000, and U.S. Provisional Application No. 202,364 filed on May 5, 2000.

BACKGROUND OF THE INVENTION

This invention relates to extruded cellular thermoplastic polymer foam materials useful for sound absorption applications.

Polymer foams having desirable sound absorption properties are well known. Many are also known that are made of thermoplastic materials. However, one of the drawbacks in using thermoplastic polyolefin foams is that they are generally not suitable for use where they would be exposed to a high service temperature environment, such as in proximity to an internal combustion engine or another source of heat and noise, due to a low heat distortion temperature. While some polymer foam materials have been developed to provide cushion properties that are capable of use in a relatively higher service temperature, they are either not suitable for efficient sound absorption over a wide range of frequencies or absorb water due to an open cell structure.

Therefore, there is still a need for improved thermoplastic polymer foam materials capable of meeting these criteria for use in such environments.

BRIEF SUMMARY OF THE INVENTION

One aspect of the present invention is cellular thermoplastic polymer foams having an average cell size of at least 1.5 millimeter (mm), a density not greater than 300 kilograms per cubic meter ($kg/m^3$), an average sound absorption coefficient of at least 0.2, and a heat distortion temperature of at least 110 degrees Celsius (° C.), wherein the thermoplastic polymer comprises:

(A) at least one predominantly isotactic, propylene polymer having at least one of (1) a tan δ value not greater than 1.5, (2) a melt tension of at least 7 centiNewtons (cN), and/or (3) a melt strength of at least 10 centiNewtons (cN) and optionally (B) at least one ethylene polymer produced via a free radical process blended with the polypropylene polymer (A), wherein:

the thermoplastic polymer comprises ethylene polymer (B) blended with the propylene polymer (A) in a weight ratio of not greater than about 65:35;

the thermoplastic polymer foam has at least one surface, the at least one surface having defined therein a multiplicity of perforation channels extending from the at least one surface into the foam such that there is an average of at least one perforation channel per 10 square centimeters ($cm^2$) area of the at least one surface; and/or the thermoplastic polymer foam has a density less than 25 $kg/m^3$.

Another aspect of the present invention relates to a process for making polymer foams useful for sound absorption in an elevated temperature and/or moist environment comprising converting a foamable composition comprising at least one blowing agent and at least one thermoplastic polymer into a cellular polymer foam having an average cell size of at least 1.5 mm, a density not greater than 300 $kg/m^3$, and at least one surface, the thermoplastic polymer comprising:

(A) at least one predominantly isotactic, propylene polymer having at least one of (1) a tan δ value not greater than 1.5, (2) a melt tension of at least 7 centiNewtons (cN), and/or (3) a melt strength of at least 10 centiNewtons (cN) and optionally (B) at least one ethylene polymer produced via a free radical process blended with the propylene polymer, comprising at least one of the following three additional conditions:

selecting as the thermoplastic polymer a polymer blend comprising ethylene polymer blended with the propylene polymer such that the weight ratio of the propylene polymer (A) to the ethylene polymer (B) is at least 35:65;

perforating at least one surface of the cellular polymer foam product to introduce a multiplicity of perforation channels extending from the at least one surface into the foam such that there is an average of at least one perforation channel per 10 square centimeters of the at least one surface and/or converting the foamable composition into the cellular polymer foam such that the cellular polymer foam has a density less than 25 $kg/^3$.

Another aspect of the process invention is a process for making polymer foams comprising:

(A) providing a cellular thermoplastic polymer foam having an average cell size of at least 1.5 mm, a density not greater than 300 $kg/m^3$, an average sound absorption coefficient of at least 0.2, a heat distortion temperature of at least 110 degrees Celsius, and at least one surface wherein the thermoplastic polymer comprises:

(1) at least one predominantly isotactic, propylene polymer having at least one of a tan δ value not greater than 1.5, a melt tension of at least 7 centiNewtons (cN) and/or a melt strength of at least 10 centiNewtons (cN) and optionally (2) at least one ethylene polymer produced via a free radical process blended with the propylene polymer, and (B) perforating the at least one surface of the polymer foam of step (A) so as to form a multiplicity of perforation channels extending from the at least one surface into the foam such that there is an average of at least one perforation channel per 10 square centimeters ($cm^2$) area of the at least one surface.

Other aspects of the present invention include polymer foams obtainable, or preferably made, according to one or more of the above processes of this invention, which preferably have an average sound absorption coefficient of at least 0.2 and a heat distortion temperature of at least 110 degrees Celsius, and the use of the above foams to absorb sound, especially in a moist and/or elevated temperature environment.

DETAILED DESCRIPTION OF THE INVENTION

1. Propylene Polymer

Figure 1:
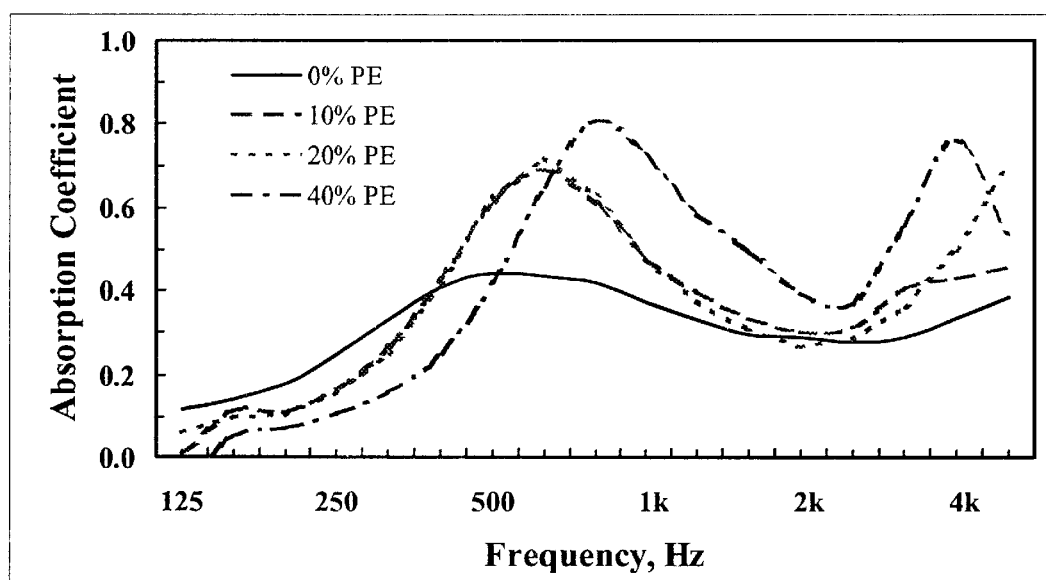
FIG. 1 shows the sound absorption curves of Example 1 skin off Tests 1.1 to 1.4 at zero perforation density described in Table 1.4 below.

The term "propylene polymer" as used herein means a polymer in which at least 50 weight percent of its monomeric units are derived directly from propylene. Suitable ethylenically unsaturated monomers other than propylene that may be included in the propylene polymer, include olefins, vinylacetate, methylacrylate, ethylacrylate, methyl methacrylate, acrylic acid, itaconic acid, maleic acid, and maleic anhydride. Appropriate propylene interpolymers include random, block, and grafted copolymers or interpolymers of propylene and an olefin selected from the group consisting of ethylene, $C_4$–$C_{10}$ 1-olefins, and $C_4$–$C_{10}$ dienes. Propylene interpolymers also include random terpolymers of propylene and 1-olefins selected from the group consisting of ethylene and $C_4$–$C_8$ 1-olefins. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, and 2,3-dimethyl-1,3-hexadiene. As used herein, the term "interpolymers" means polymers derived from the reaction of two of more different monomers and includes, for example, copolymers and terpolymers.

The propylene polymer material may be comprised solely of one or more propylene homopolymers, one or more propylene copolymers, and blends of one or more of each of propylene homopolymers and copolymers. The polypropylene preferably comprises at least about 70, even more preferably at least about 90, and even more preferably about 100, weight percent propylene monomer derived units (i.e., the propylene homopolymers are preferred).

The propylene polymer preferably has a weight average molecular weight ($M_w$) of at least 100,000. $M_w$ can be measured by known procedures.

The propylene polymer also preferably has a branching index less than 1. The branching index is an approach to quantifying the degree of long chain branching selected for this particular invention. The definition of branching index and procedure for determining the same is described in column 3, line 65 to column 4, line 30, of U.S. Pat. No. 4,916,198, which is incorporated herein by reference. The branching index is more preferably less than about 0.9, and even more preferably less than about 0.4.

The propylene polymer has a tan δ value not greater than 1.5, preferably not greater than 1.2, even more preferably not greater than 1.0, and even more preferably not greater than 0.8. Tan δ may be calculated from g"/g', where g" is the loss modulus of the propylene polymer and g' is storage modulus of the propylene polymer melt using a 2.5 mm thick and 25 mm diameter specimen of the propylene polymer at 190° C. at a one Radian per second oscillating frequency. These parameters may be measured using a mechanical spectrometer, such as a Rheometrics Model RMS-800 available from Rheometrics, Inc., Piscataway, N.J., U.S.A. Further details of how to carry out this determination of the tan δ, g' and g" values is provided in column 5, lines 59 to 64, and column 6, lines 4 to 29, of U.S. Pat. No. 5,527,573, which is incorporated herein by reference.

In addition or in the alternative, the propylene polymer preferably has a melt tension of at least about 7 centiNewtons (cN), more preferably at least about 10 cN, and even more preferably at least about 15 cN, and even more preferably at least about 20 cN. Preferably, the propylene polymer has a melt tension not greater than about 60 cN, more preferably not greater than about 40 cN. The term "melt tension" as used throughout this description refers to a measurement of the tension in cN of a strand of molten polymer material at extruded from a capillary die with an diameter of 2.1 mm and a length of 40 mm at 230° C. at an extrusion speed of 20 mm/minute (min.) and a constant take-up speed of 3.14 meter/minute using an apparatus known as a Melt Tension Tester Model 2 available from Toyo Seiki Seisaku-sho, Ltd. This method for determining melt tension is sometimes referred to as the "Chisso method".

In addition or in the alternative, the propylene polymer preferably has a melt strength of at least about 10 centiNewtons (cN), more preferably at least about 20 cN, and even more preferably at least about 25 cN, and even more preferably at least about 30 cN. Preferably, the propylene polymer has a melt strength not greater than about 60 cN, more preferably not greater than about 55 cN. The term "melt strength" throughout this description refers to a measurement of the tension in cN of a strand of molten polymer material extruded from a capillary die with an diameter of 2.1 mm and a length of 41.9 mm at 190° C. at a rate of 0.030 cc/sec. and stretched at a constant acceleration to determine the limiting draw force, or strength at break, using an apparatus known as a Gottfert Rheotens™ melt tension apparatus available from Gottfert, Inc.

The propylene polymer used in the process of the invention preferably also has a melt elongation of at least 100 percent, more preferably at least 150 percent, most preferably at least 200 percent as measured by the same Rheotens™ melt tension apparatus and general procedure described above.

The propylene polymer material preferably also has a melt flow rate of at least about 0.01 more preferably at least about 0.05, even more preferably at least about 0.1 g/10 min., and even more preferably at least about 0.5 g/10 min. up to about 100, more preferably up to about 50, even more preferably up to about 20, and even more preferably up to about 10, g/10 min. Throughout this description, the term "melt flow rate" refers to a measurement conducted according to American Society for Testing and Materials (ASTM) D-1238 condition 230° C./2.16 kg. (aka Condition L).

Preferred propylene polymers include those that are branched or lightly cross-linked. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. This method is illustrated in U.S. Pat. Nos. 3,250,731 with a polyfunctional azide, U.S. Pat. No. 4,714,716 (and published International Application WO 99/10424) with an azidofunctional silane and EP 879,844-A1 with a peroxide in conjunction with a multi-vinyl functional nomoner. The aforementioned U.S. patents are incorporated herein by reference. Irradiation techniques are illustrated by U.S Pat. Nos. 5,605,936 and 5,883,151, which are also incorporated by reference. The polymer composition used to prepare the foam preferably has a gel content of less than 10 percent, more preferably less than 5 percent, per ASTM D2765-84, Method A.

2. Ethylene Polymer

The term "ethylene polymer" as used herein means a polymer in which at least 50 weight percent of its monomeric units are derived directly from ethylene. The ethylene polymer is at least one ethylene polymer produced via a free radical process. The ethylene polymer is preferably produced without the presence of a catalyst, particularly a solid catalyst or another catalyst capable of acting as a nucleating agent for the foamable composition used to make the foams of the present invention. The ethylene polymers are preferably low density polyethylene (LDPE), vinyl esters of monocarboxylic acids such as vinyl acetate and vinyl propionate and esters of monoethylenic carboxylic acids such as methyle (meth)acrylate, ethyl (meth)acrylate, propyl (meth)acrylate, and mixtures thereof. Suitable ethylene interpolymers include those described as "soft ethylenic polymers" in U.S. Pat. No. 4,101,467, the disclosure of which is incorporated herein by reference. Specific examples of preferred ethylene polymers include LDPE, ethylene-vinyl acetate copolymer (EVA), ethylene-ethyl acrylate copolymer (EEA), and/or ethylene-acrylic acid copolymer (EAA), and mixtures thereof.

The amount of monomer other than ethylene incorporated into the ethylene polymer is less than 50 weight-percent (wt %), more preferably not greater than 30 wt %, even more preferably not greater than 10 wt %, and even more preferably not greater than 1 wt %. The ethylene polymers are preferably low density polyethylene (LDPE).

The above-mentioned ethylene polymers are readily available as commercial products and/or the processes for making them are well known. The Dow Chemical Company, for example, is a well known manufacturer of some of the above-identified ethylene polymers, such as the preferred LDPE.

The ethylene polymer has a melt index, $I_2$, preferably in the range from at least about 0.01, more preferably 0.05 and even more preferably at least 0.1, g/10 min. up to 100, more preferably up to 50, and even more preferably up to 20, g/10 min. Throughout this description, the term "melt index" refers to a measurement conducted according to ASTM D-1238, condition 190° C./2.16 kg.

3. Optional Third Polymer Component

Also included as an optional polymer component are the so called substantially random interpolymers which comprise polymer units derived from one or more α-olefin monomers with one or more vinyl or vinylidene aromatic monomers and/or a hindered aliphatic or cycloaliphatic vinyl or vinylidene monomers. The term substantially random as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method,* Academic Press New York, 1977, pp. 71–78. Preferably, substantially random interpolymers do not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Suitable α-olefins include for example, α-olefins containing from 2 to about 20, preferably from 2 to about 12, more preferably from 2 to about 8 carbon atoms. Particularly suitable are ethylene, propylene, butene-1, pentene-1,4-methyl-1-pentene, hexene-1 or octene-1 or ethylene in combination with one or more of propylene, butene-1, 4-methyl-1-pentene, hexene-1 or octene-1. These α-olefins do not contain an aromatic moiety.

Suitable vinyl or vinylidene aromatic monomers which can be employed to prepare the interpolymers include, for example, those represented by the following formula:

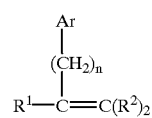

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl and $C_{1-4}$-haloalkyl; and n has a value from zero to about 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methylstyrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

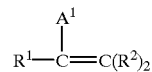

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include norbornene and $C_{1-10}$ alkyl or $C_{6-10}$ aryl substituted norbornenes. Exemplary substantially random interpolymers include ethylene/styrene, ethylene/styrene/propylene, ethylene/styrene/octene, ethylene/styrene/butene, and ethylene/styrene/norbornene interpolymers.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers may also be modified by various cross-linking processes including, but not limited to peroxide-, silane-, sulfur-, radiation-, or azide-based cure systems. A full description of the various cross-linking technologies is described in copending U.S. patent application Ser. No. 08/921,641, now issued as U.S. Pat. No. 5,869,591, and U.S. Ser. No. 08/921,642, now issued as U.S. Pat. No. 5,977,271, both filed on Aug. 27, 1997, the entire contents of both of which are herein incorporated by reference. Dual cure systems, which use a combination of heat, moisture cure, and radiation steps, may be effectively employed. Such dual cure systems are disclosed and claimed in U.S. patent application Ser. No. 536,022, filed on Sep. 29, 1995, in the names of K. L. Walton and S. V. Karande, now issued as U.S. Pat. No. 5,911,940, which is incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

The substantially random interpolymers include the pseudo-random interpolymers as described in EP-A-0,416, 815 by James C. Stevens et al. and U.S. Pat. No. 5,703,187 by Francis J. Timmers, both of which are incorporated herein by reference in their entirety. The substantially random interpolymers also include the substantially random terpolymers as described in U.S. Pat. No. 5,872,201 which is incorporated herein by reference in their entirety. The substantially random interpolymers are best prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in EP-A-416,815; EP-A-514,828; and EP-A-520,732 as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; and 5,470,993[LR1], all of which are incorporated herein by reference.

The substantially random α-olefin/ vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2 /Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si(Me_4Cp)(N$-tertbutyl$)TiCl_2$/methyl-aluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene is described in U.S. Pat. No. 5,244,996, issued to Mitsui Petrochemical Industries Ltd and U.S. Pat. No. 5,652,315 also issued to Mitsui Petrochemical Industries Ltd or as disclosed in DE 197 11 339 A1 and U.S. Pat. No. 5,883,213 to Denki Kagaku Kogyo KK. All the above methods disclosed for preparing the interpolymer component are incorporated herein by reference. Also, the random copolymers of ethylene and styrene as disclosed in Polymer Preprints Vol 39, No. 1, March 1998 by Toru Aria et al. can also be employed as blend components for the foams of the present invention.

The substantially random interpolymers usually contain from about 0.5 to about 65, preferably from about 1 to about 55, more preferably from about 1 to about 50 mole percent of at least one vinyl or vinylidene aromatic monomer and/or hindered aliphatic or cycloaliphatic vinyl or vinylidene monomer and from about 35 to about 99.5, preferably from about 45 to about 99, more preferably from about 50 to about 99 mole percent of ethylene and/or at least one aliphatic α-olefin having from 3 to about 20 carbon atoms.

The substantially random interpolymer(s) applicable to the present invention can have a melt index of from about 0.01 to about 1000, and preferably from about 0.01 to about 100, more preferably from about 0.05 to about 50 grams per 10 minutes (as determined by ASTM Test Method D 1238, Condition 190° /2.16).

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent, most preferably less than 10 weight percent based on the total weight of the interpolymers of atactic vinyl or vinylidene aromatic homopolymer is present.

Most preferred as the optional third polymer component are the substantially random interpolymers such as those marketed by The Dow Chemical Company under the INDEX™ tradename, the polyolefin plastomers, such as those marketed by The Dow Chemical Company under the AFFINITY™ tradename and polyethylene elastomers, such as those marketed by Du Pont Dow Elastomers PLC under the ENGAGE™ tradename.

4. Production of the Polymer Foam

According to one aspect of the present invention, a foamable composition comprising at least one blowing agent and at least one thermoplastic polymer comprising at least one predominantly isotactic, propylene polymer having a tan δ value not greater than 1.5 and, optionally, at least one ethylene polymer produced via a free radical process blended with the propylene polymer is converted into a cellular polymer foam having a density not greater than about 300 kg/m$^3$. In a preferred embodiment, the conversion is carried out via extrusion of the foamable composition. Preparation of suitable foam materials according to the present invention desirably uses conventional extrusion procedures and apparatus such as those detailed in U.S. Pat. Nos. 5,527,573 and 4,824,720, each of which are incorporated herein by reference.

In an extrusion foaming process, the polymer constituents are converted into a polymer melt and incorporates a blowing agent and, if desired, other additives into the polymer melt to form a foamable gel. One then extrudes the foamable gel through a die and into a zone of reduced or lower pressure that promotes foaming to form a desired product. The reduced pressure is lower than that under which the foamable gel is maintained prior to extrusion through the die.

Before extruding foamable gel through the die, the foamable gel is cooled from a temperature that promotes melt mixing to a lower temperature which is generally within 30° centigrade (° C.) the melt temperature ($T_m$) of the constituent polymers of the foamable composition.

The blowing agent may be incorporated or mixed into the polymer melt by any means known in the art such as with an extruder, mixer, or blender. The blowing agent is mixed with the polymer melt at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting.

Any conventional blowing agent may be used to make foams according to the present invention. U.S. Pat. No. 5,348,795 discloses a number of suitable blowing agents at column 3, lines 15–61, the teachings of which are incorporated herein by reference. U.S. Pat. No. 5,527,573 also discloses a number of suitable blowing agents at column 4, line 66 through column 5, line 20, the teachings of which are incorporated herein by reference. Preferred blowing agents include aliphatic hydrocarbons having 1–9 carbon atoms, especially propane, n-butane and isobutane.

Foams of the present invention may also be made using an accumulating extrusion process and apparatus such as that shown in U.S. Pat. No. 4,323,528 and U.S. Pat. No. 5,817,705, the teachings of which are incorporated herein by reference. This apparatus, commonly known as an "extruder-accumulator system" allows one to operate a process on an intermittent, rather than a continuous, basis. The apparatus includes a holding zone or accumulator where foamable gel remains under conditions that preclude foaming. The holding zone is equipped with an outlet die that opens into a zone of lower pressure, such as the atmosphere. The die has an orifice that may be open or closed, preferably by way of a gate that is external to the holding zone. Operation of the gate does not affect the foamable composition other than to allow it to flow through the die. Opening the gate and substantially concurrently applying mechanical pressure on the gel by a mechanism (e.g. a mechanical ram) forces the gel through the die into the zone of lower pressure. The mechanical pressure is sufficient to force foamable gel through the die at a rate fast enough to preclude significant foaming within the die yet slow enough to minimize and preferably eliminate generation of irregularities in foam cross-sectional area or shape. As such, other than operating intermittently, the process and its resulting products closely resemble those made in a continuous extrusion process.

Foams of the present invention may also be formed in a coalesced strand form by extrusion of the thermoplastic polymer resin (that is, polymer material) through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are taught in U.S. Pat. Nos. 3,573,152 and 4,824,720, each of which is incorporated herein by reference.

The present foam structure may also be formed into foam beads suitable for molding into articles. The foam beads may be prepared by an extrusion process or a batch process. In the extrusion process, the foam strands coming out of a multi-hole die attached to a conventional foam extrusion apparatus are granulated to form foam beads. In a batch process, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is taught in U.S. Pat. Nos. 4,379,859 and 4,464,484, each of which is incorporated herein by reference.

The foams of the present invention may contain one or more conventional additives. The additives include, without limitation, inorganic fillers, conductive fillers, pigments, antioxidants, acid scavengers, flame retardants, ultraviolet absorbers, processing aids, extrusion aids, permeability modifiers, anti-static agents, radiation blocking materials and other thermoplastic polymers. The foam materials of this invention preferably contain at least one of a radiation blocking material such as carbon black and a flame retardant additive.

The matrix solids of the foam made by the process of the invention preferably comprise at least 70 wt %, more preferably at least 80 wt %, and even more preferably at least 85 wt %, propylene polymer (A) plus any of the optional ethylene polymer (B).

The foam of this invention preferably has an average cell size of at least about 2 mm, more preferably at least about 3 mm, even more preferably at least about 4 mm, even more preferably at least about 5 mm, and even more preferably at least about 6 mm. The expression "average cell size" as used throughout this description refers to the average cell size of the foam body determined according to ASTM D 3756.

The density of the foam is preferably not greater than about 60, more preferably not greater than 30, and even more preferably less than 25, kg/m$^3$, and is preferably at least about 1, more preferably at least about 5, kg/m$^3$.

The foam of this invention preferably has an open cell content of less than 50 percent, more preferably not greater than 20 percent, when measured according to ASTM D2856, Procedure A. In another embodiment, the foam of this invention preferably has an open cell content of less than 50 percent, more preferably not greater than 20 percent, when measured according to ASTM D2856, Procedure C.

5. Adding Perforation Channels

The foam of this invention preferably has perforation channels, more preferably a multiplicity of perforation channels extending from the at least one surface into the foam such that there is an average of at least one, preferably at least 5, more preferably at least 10, even more preferably at least 20, and even more preferably at least 30, perforation channel(s) per 10 square centimeters (cm$^2$) area of the at least one surface. The term "multiplicity" as used herein means at least two. In a preferred embodiment, the foam of this invention contains at least seven perforation channels.

The perforation channels preferably have an average diameter at the at least one surface of at least about 0.1 mm, more preferably at least about 0.5 mm, and even more preferably at least about 1 mm and preferably up to about the average cell size of the foam measured according to ASTM D 3756. One or more surfaces of the foam preferably has an average of at least four perforation channels per square centimeter extending from the at least one surface into the foam.

The polymer foam of step (A) preferably has an average thickness perpendicular to the surface perforated by step (B) of at least about 25 mm and the polymer foam of step (A) is preferably perforated according to step (B) to an average depth of at least 5 mm below the surface of the polymer foam.

Typically, perforation comprises puncturing the base foam with one or more pointed, sharp objects. Suitable pointed, sharp objects include needles, spikes, pins, or nails. In addition, perforation may comprise drilling, laser cutting, high pressure fluid cutting, air guns, or projectiles. A description of how to create suitable perforation channels for a different purpose, namely to accelerate release of blowing agent from the foam, is provided in U.S. Pat. No. 5,585,058, which is incorporated herein by reference.

In addition, the base foam may be prepared to have elongated cells by pulling the foam during expansion. Such pulling results in elongated cells without changing or often, increasing the cell size in the horizontal direction. Thus, pulling results in an increased average cell size in the direction perpendicular to the vertical direction (EH average) and facilitates perforation.

Perforation of the base foam may be performed in any pattern, including square patterns and triangular patterns. Although the choice of a particular diameter of the sharp, pointed object with which to perforate the base foam is dependent upon many factors, including average cell size, intended spacing of perforations, pointed, sharp objects useful in the preparation of certain foams of the present invention will typically have diameters of from 1 mm to 4 mm.

Compression may be used as an additional means of opening cells. Compression may be performed by any means sufficient to exert external force to one or more surfaces of the foam, and thus cause the cells within the foam to burst. Compression during or after perforation is especially effective in rupturing the cell walls adjacent to the channels created by perforation since a high pressure difference across the cell walls can be created. In addition, unlike needle punching, compression can result in rupturing cell walls facing in all directions, thereby creating tortuous paths desired for sound absorption.

The mechanical opening of closed-cells of the base foam lowers the airflow resistivity of the base foam by creating large-size pores in the cell walls and struts. In any event, regardless of the particular means by which it does so, such mechanical opening of closed-cells within the base thermoplastic polymer foam serves to enhance the usefulness of the foam for sound absorption and sound insulation applications.

Of course, the percentage of cells opened mechanically will depend on a number of factors, including cell size, cell shape, means for opening, and the extent of the application of the means for opening applied to the base foam.

One aspect of the present invention is a method for making cellular acoustic absorption polymer foam comprising:

(A) Providing a polymer foam having an average cell size preferably in the range from about 1.5 mm to about 4 mm and an open cell content not greater than about 40 percent, more preferably not greater than 30 percent, and even more preferably not greater than 20 percent, measured according to ASTM D2856, Procedure A, and (B) Perforating the polymer foam provided in step (A) at a surface of the polymer foam to form a multiplicity of perforation channels extending from that surface into the polymer foam such that the open cell content of the foam measured according to ASTM D2856, Procedure A, is increased relative to the step (A) polymer foam by at least about 10 percent, more preferably at least about 15 percent, to obtain a perforated polymer foam having an open cell content of at least about 20 percent, measured according to ASTM D2856, Procedure A.

The polymer foams perforated in this manner have certain advantages, such as improved thermal insulating performance and/or improved resistance to water absorption.

5. Performance and Utility

The foam of the present invention has excellent acoustic absorption capabilities. One way to measure the ability to absorb sound is to measure the acoustic absorption coefficient of the foam according to ASTM E-1050 at 250, 500, 1000 and 2000 Hz and then calculate an arithmetic average of those sound absorption coefficients. When that determination is made with the foams of the present invention, the average sound absorption coefficient is preferably at least about 0.2, more preferably at least about 0.3, even more preferably at least about 0.4, and even more preferably at least about 0.5.

The foam of this invention is useful for absorbing sound in the range from 20 to 20,000 Hz, preferably 50 to 5,000 Hz and even more preferably 250 to 2000 Hz, preferably such that the sound absorption capability is equivalent to the foregoing preferred average sound absorption coefficients. For example, the foam may be located in the presence of a sound intensity of at least 50 decibels, such as on a vehicle equipped with a combustion engine.

An important advantage of the present invention is the ability to use the inventive foams in locations where a high service temperature is required and yet have a foam that is thermoformable and potentially recyclable. An example is in the compartment of a motor, such as an internal combustion engine, such as found on a vehicle, electric generator, compressor or pump. An indication of high service temperature is resistance to heat distortion at elevated temperatures. As used herein, the expression, "heat distortion temperature" refers to the maximum temperature at which the foam body does not shrink more than 5 percent by volume during an exposure to that temperature for one hour. Preferably the heat distortion temperature of the foams according to the present invention is at least about 130, more preferably at least about 140, and even more preferably at least about 150, ° C.

Another advantage of the foam of the present invention is that the high average sound absorption coefficient is achieved with a low water absorption. That is desirable to help limit corrosion of proximate metal parts, to avoid the growth of bacteria and mold, and to improve thermal insulation value where that is needed. The inventive foam preferably does not absorb more than 10, 5, 3, more preferably not more than 1.5, and even more preferably not more than 1, percent water by volume when measured according to European Norm (EN) 12088 at a 50° C. temperature gradient between a warm, water-saturated atmosphere and the foam (the latter of which is maintained at a temperature at or below about 0° C. in order to condense the water onto the surface of the foam sample) based on a test period of 14 days exposure.

The following examples illustrate, but do not in any way limit the scope of the present invention. All parts and percentages are by weight and all temperatures are in ° C. unless otherwise stated.

EXAMPLES

Examples 1 and 2 which follow are prepared from the components sumnarized in the following Table 1.

Example 1

In this example, polypropylene (PP) and a series of polypropylene/polyethylene (PE) blends having a blend ratio from 90/10 to 50/50 are subjected to foam expansion tests on a foam extrusion line. The apparatus used in this example is a 2 inch (50.8 mm) screw-type extruder having two additional zones for mixing and cooling at the end of usual sequential zones for feeding, melting and metering. An opening for blowing agent injection is provided on the extruder barrel between metering and mixing zone. At the end of cooling zone, there is attached a gap-adjustable die orifice having a width of 50 mm.

The resins are fed into the extruder in granular form at the ratios specified in Table 1.1 below at a total rate of 60 kg/h. In addition, carbon black (CB) and antioxidant (AO) are also fed at the rates specified in that Table. The carbon black is used as a colorant. The temperatures maintained at the extruder zones are 160° C. at feeding zone, 185° C. at melting zone, 225° C. at metering zone and 220° C. at the mixing zone. Isobutane is injected into the mixing zone at the specified rate.

TABLE 1.1

COMPONENT ADDITION RATES

| Test | PP[1] | PE1[1] | IB[2] | CB[2] | AO[2] |
|------|-------|--------|-------|-------|-------|
| 1.1  | 100   | 0      | 10    | 1.2   | 0.1   |
| 1.2  | 90    | 10     | 10    | 1.2   | 0.1   |
| 1.3  | 80    | 20     | 10    | 1.2   | 0.1   |
| 1.4  | 60    | 40     | 10    | 1.2   | 0.1   |
| 1.5  | 60    | 40     | 13    | 1.2   | 0.1   |
| 1.6  | 50    | 50     | 10    | —     | 0.1   |

[1]Weight-percent resin based on the total weight of PP and PE1
[2]Measured as pph based on a total extrusion rate of 60 kg/hour The temperatures of the cooling zone and the die block (both were maintained at the same temperature) are gradually lowered and the gap of the die opening is adjusted until a good quality foam is produced. Good-quality foams having large cells are produced throughout the tests of this example according to the parameters set forth in Table 1.2 below.

TABLE 1

COMPONENTS IN FOAMABLE COMPOSITIONS OF THE EXAMPLES

| Component | Designation | Source | Description |
|-----------|-------------|--------|-------------|
| PP | Profax ™ PF-814 | Montell Polyolefins | HMS PP resin, MFR = 3 g/10 min. tan ☐ = 1.16, melt strength = 37 cN |
| PE1 | | | LDPE resin, MI = 1.0 g/10 min., density = 0.92 g/cm³ |
| PE2 | | | LDPE resin, MI = 1.8 g/10 min., density = 0.92 g/cm³ |
| IB | | | Isobutane used as blowing agent |
| GMS | | | Glycerol monostearate added as 10 wt % concentrate in LDPE base resin, resin MI = 1.75 g/10 min., density = 0.92 g/cm³ used as cell stability promoter |
| CB | Plasblak ™ PE 3037 | Cabot Plastics Int'l. | Carbon black as a 25 wt % concentrate in LDPE base resin, resin MI = 2 g/10 min., added as colorant |
| A0 | Irganox 1010 | Ciba Geigy Corp. | Antioxidant |

"MI" refers to melt index per ASTM D-1238 condition 190° C./2.16 kg.
"MFR" refers to melt flow rate per ASTM D-1238 condition 230° C./2.16 kg.
"HMS PP" refers to high melt strength polypropylene.
"LDPE" refers to low density polyethylene, which is an ethylene homopolymer made via a free radical process.

TABLE 1.2

FOAMING PARAMETERS

| Test | Foaming Temperature[3] | Foam Thickness[4] | Width[4] | Density[5] |
|---|---|---|---|---|
| 1.1 | 158 | 15 | 140 | 27 |
| 1.2 | 156 | 19 | 131 | 28 |
| 1.3 | 156 | 24 | 135 | 26 |
| 1.4 | 156 | 20 | 157 | 27 |
| 1.5 | 156 | 20 | 179 | 24 |
| 1.6 | 159 | 20 | 146 | 31 |

[3]Measured in degrees Celsius
[4]Measured in millimeters
[5]Measured in kg/m$^3$ The foams are aged over one month before being subjected to the property tests described in Tables 1.3 to 1.5 below.

TABLE 1.3

RESULTING FOAM PHYSICAL PROPERTIES

| Test | Cell Size[6] | Open Cell Content[7] | Heat Distortion Temperature[8] |
|---|---|---|---|
| 1.1 | 6.5 | 2 | 150 |
| 1.2 | 7.4 | 2 | 150 |
| 1.3 | 8.3 | 1 | 150 |
| 1.4 | 9.0 | 0 | 140 |
| 1.5 | 4.9 | 14 | 140 |
| 1.6 | 8.7 | 19 | 160 |

[6]Average cell size in millimeters determined according to ASTM D 3756
[7]Percentage determined according to ASTM D 2856, Procedure A
[8]Maximum temperature in degrees Celsius at which foam does not shrink more than 5 percent by volume The foams produced from the PP resin and PP/PE blends having a 40% or lower level of the LDPE resin are substantially closed celled. The open cell content was measured with specimens of 45 mm in diameter and the natural thickness of the foam body with skins left at the both ends. The 50/50: PP/PE blend (Test No. 1.6) yields a foam having a slightly greater open cell content of 19%, which could be partly a result of the higher foaming temperature (159° C.). All the foams have low densities and large cells. The PP/LDPE blends achieve a larger cell size than 100 percent PP resin. The heat distortion temperatures of the test foams are, at the lowest, 140° C. Thus, these foams can be used where a resistance to such a high temperature is required.

The above test foams listed in Table 1.3 are subjected to sound absorption tests. The apparatus used to conduct the sound absorption tests is a Model 4206 acoustical impedance tube and Model 3555 signal analyzer, both available from Brueel and Kjaer A/S, Naerum, Denmark. This apparatus is used to measure a normal incidence sound absorption coefficient of a material according to the method described in ASTM E-1050.

The sound absorption tests are done with 29 mm diameter specimens having a thickness of 25 mm. Since the as-extruded foams are thinner than 25 mm, the thickness is built up by stacking two pieces of 12.5 mm-thick slugs. Cylinders of 29 mm diameter are bored out of the extruded plank. The cylinders are trimmed to slugs of approximately 12.5 mm in thickness. One set of slugs are prepared with the skin on the one side and another set with skins from both ends removed. In the tests with the skins-on specimens, the two slugs with skins are packed in the imdepdance tube so that the skins go to the opposite end of the stack. That is, the skinned surfaces are positioned to face the incident sound wave and at the opposite end of the stack. There is left no space between the two slugs.

After sound absorption tests are conducted with the nascent, nonperforated foam specimens, the foam specimens are perforated in situ with a 2 mm-diameter needle in a 10 mm×10 mm square pattern. The perforation made a total of five holes in the specimen, which amounts to a hole density of approximately 0.76 holes per square centimeter. After sound absorption tests are conducted with the the specimens perforated in a 10 mm×10 mm square pattern, additional holes are punched into the same specimen so that the hole pattern is a 5 mm×5 mm square pattern. The resulting 21 holes in the specimen corresponds to a hole density of approximately 3.18 holes per square centimeter. After that more densely perforated specimen is tested, the sound absorption tests are repeated with the foam specimens with the skins removed.

The sound absorption data for the foams with and without skins are summarized in Tables 1.4 and 1.5, respectively. A couple of exemplary sets of absorption curves are presented in FIGS. 1 and 2. From the data in the table and figures, the effect of polymer composition, the existence of the skin and the perforation density on the sound absorption coefficient can be examined.

TABLE 1.4

AVERAGE SOUND ABSORPTION COEFFICIENTS[9] WITH SKIN ON FOAM

| | | Perforation Density[10] | | |
|---|---|---|---|---|
| Test | PE1[1] | 0 | 1 | 4 |
| 1.1 | 0 | 0.34 | 0.44 | 0.46 |
| 1.2 | 10 | 0.39 | 0.44 | 0.44 |
| 1.3 | 20 | 0.38 | 0.42 | 0.44 |
| 1.4 | 40 | 0.41 | 0.45 | 0.45 |
| 1.5 | 40 | 0.34 | 0.39 | 0.45 |
| 1.6 | 50 | 0.41 | 0.43 | 0.38 |

Figure 2:
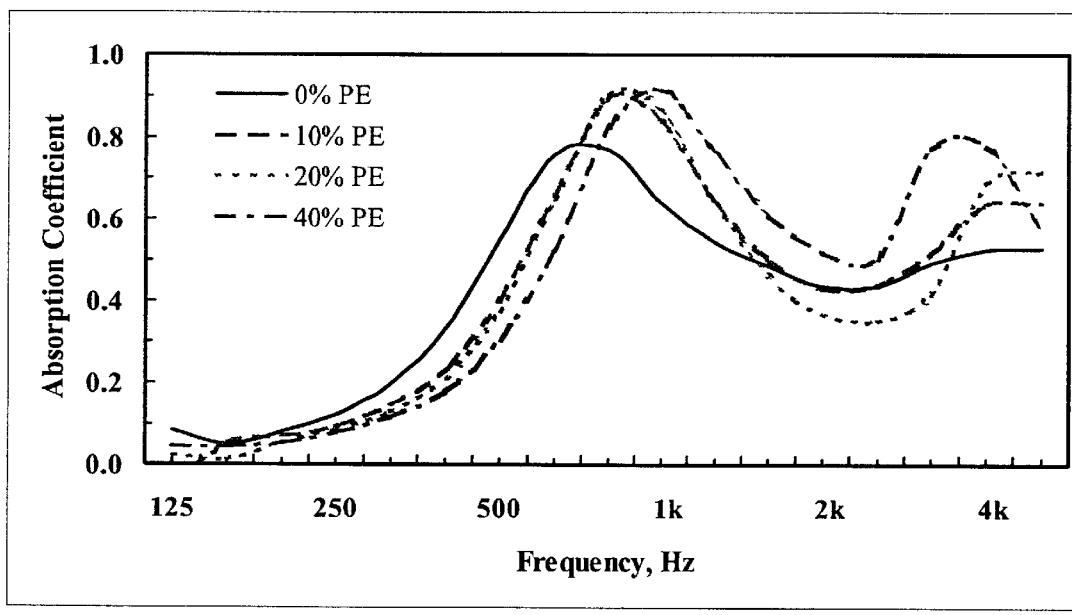
FIG. 2 shows the sound absorption curves of Example 1 skin off Tests 1.1 to 1.4 at perforation density "1" also described in Table 1.4 below.

[1]Weight percent PE1 based on the total weight of PP and PE1
[9]Arithmetic average of the sound absorption coefficients measured at 25, 500, 1000 and 2000 Hz, each sound absorption coefficient determined according to ASTM E-1050 using specimens of 29 mm diameter and 25 mm thickness
[10]Nominal perforation density/cm$^2$ foam surface area:
0 = nascent foam with no perforations
1 = perforation in 10 mm × 10 mm pattern, actual perforation density = 0.76/cm$^2$
4 = perforation in 5 mm × 5 mm pattern, actual perforation density = 3.18/cm$^2$ The absorption curves presented in FIGS. 1 and 2 exemplify the results obtained with the Test 1.1 to 1.4 skin-on foams (referenced by their corresponding PE1 contents). FIG. 1 shows the results with a zero perforation density and FIG. 2 shows the results with a perforation in a 10 mm×10 mm pattern.

In FIG. 1, absorption curves have maxima at a frequency between 500 Hz and 1000 Hz. As shown, the PP/PE 1 blend foams generally absorbed sound better than the 100 percent PP foam. Among the blend foams, a 60/40: PP/PE blend foam exhibits a higher maximum absorption than the 90/10 and 80/20 blend foams.

Although perforation tends to reduce the difference in the sound absorption capabilities among the foams as shown in FIG. 2, the foams made from the PP/PE1 blends generally performed better acoustically than the PP foam.

Since end users often skive foam planks to their end use requirements, data is also presented for Tests 1.1 to 1.4 without the foam skin in Table 1.5 below.

TABLE 1.5

AVERAGE SOUND ABSORPTION COEFFICIENTS[9] WITH SKIN OFF FOAM

| Test | PE1[1] | Perforation Density[10] | | |
|---|---|---|---|---|
| | | 0 | 1 | 4 |
| 1.1 | 0 | 0.38 | 0.41 | 0.42 |
| 1.2 | 10 | 0.42 | 0.44 | 0.38 |
| 1.3 | 20 | 0.42 | 0.43 | 0.37 |
| 1.4 | 40 | 0.41 | 0.44 | 0.43 |
| 1.5 | 40 | 0.39 | 0.45 | 0.42 |

[1,9&10]are defined above
[11]Foam skin is removed from the ends of the specimen used for measuring the average sound absorption coefficient.

Example 2

The apparatus used in this example is a 6"(152.4 mm) foam production line having essentially the same configuration as used in Example 1. At the end of cooling zone, there is attached a die orifice having an opening of generally rectangular shape. In this example, a commercial-size foam plank is produced from a 60/40 blend of Pro-fax™ PF-814 polypropylene resin (PP) and a low density polyethylene (LDPE) resin (PE2) having a density of 0.923 g/cm$^3$ and a melt index of 1.8 per ASTM D- 1238 condition 190° C./2.16 kg.

The resins are fed into the extruder in granular form at the ratio specified in Table 2.1 below and at a total rate of 726 kg/h. Components PP, PE2, IB, GMS and AO in Table 2.1 are defined in Table 1 above. The temperatures maintained at the extruder zones are 175° C. at feeding zone, 210° C. at melting zone, 220° C. at metering zone and 190° C. at the mixing zone. Isobutane is injected into the mixing zone at a uniform rate of 7 pph. The temperatures of the cooling zone and the die block (both are maintained approximately at the same temperature) are gradually lowered until a good quality foam is produced.

TABLE 2.1

COMPONENT ADDITION RATES

| PP[1] | PE2[1] | IB[2] | GMS[2] | AO[2] |
|---|---|---|---|---|
| 60 | 40 | 7 | 1.5 | 0.5 |

[1]Weight-percent resin based on the total weight of PP and PP2
[2]Measured as pph based on a total extrusion rate of 726 kg/hour At the foaming temperature of 154° C., an excellent quality foam of macro cell size of 9.2 mm is produced. As shown in Tables 2.2 and 2.3, the foam has a large cross-sectional size (65mm×592 mm), no open cells and 150° C. heat distortion temperature. The open cell content of the foam is determined using a cylindrical foam specimen of 45 mm in diameter and approximately 60 mm in length.

TABLE 2.2

FOAMING PARAMETERS

| | Foam | | |
|---|---|---|---|
| Foaming Temperature[3] | Thickness[4] | Width[4] | Density[5] |
| 154 | 65 | 592 | 37 |

[3,4&5]are defined above

TABLE 2.3

RESULTING FOAM PHYSICAL PROPERTIES

| Cell size[6] | Open Cell Content[7] | Heat Distortion Temperature[8] |
|---|---|---|
| 9.2 | 0 | 150 |

[6,7& 8]are defined above

The foam prepared in this example is subjected to the sound absorption tests. The test apparatus and the operating procedure are essentially the same as in Example 1. In this series of tests, there is examined the effect of the specimen thickness on sound absorption as well as that of the skin and perforation.

Unlike in the tests in Example 1, both 29 mm diameter and 100 mm diameter test specimens are employed to generate the sound absorption curve of each foam. Cylinders having diameters of 29 mm and 100 mm are bored out of the as-extruded plank. The cylinders are cut to specimens of 50 mm thickness with the skin left on one side. One set of 29 mm and 100 mm-diameter specimens is perforated and another is not perforated. Perforation is done with a 2 mm-diameter needle in a 10 mm×10 mm square pattern. The perforation renders 5 holes in the 29 mm-diameter specimen that amounts to a hole density of 0.76 holes/cm$^2$. In the case of the 100 mm diameter specimen, the large number of holes punched therein leads to a hole density closed to 1 hole/cm$^2$. For each set of specimens, the sound absorption tests are conducted as follows.

First, the 50 mm-thick specimens are tested with the skinned surface aligned toward the incident wave. The absorption curves of the small and the large specimens are combined in order to obtain one absorption curve. The curve of the large specimen is taken for low frequencies and that of the small specimen is taken for the high frequencies. Then, the specimens are flipped over with the cut surface facing the incident wave and tested. After those tests, the specimens were shaved down to a 35 mm thickness and tested. The procedure is repeated to obtain the sound absorption data for 25 mm and 10 mm thick foams. The data for the perforated foams are gathered by the same procedure.

The sound absorption data are summarized in Tables 2.4 and 2.5 below.

TABLE 2.4

SOUND ABSORPTION PERFORMANCE OF EXAMPLE 2 FOAM WITH SKIN ON FOAM

| Thickness of Specimen | Perforation Density[10] | Ave. Sound Abs. Coeff.[9] | Max" | fmax[12] |
|---|---|---|---|---|
| 50 mm | 0 | 0.39 | 0.47 | 400 |
| | 1 | 0.53 | 0.87 | 500 |
| | 0 | 0.38 | 0.58 | 500 |
| 35 mm | 1 | 0.48 | 0.90 | 530 |
| | 0 | 0.35 | 0.63 | 800 |
| 25 mm | 1 | 0.39 | 0.90 | 800 |
| | 0 | 0.26 | 0.72 | 1200 |
| 10 mm | 1 | 0.28 | 0.84 | 2000 |

[9&10]are defined above
[11]is the first maximum sound absorption coefficient determined according to ASTM E-1050
[12]is the frequency in Hertz corresponding to the first maximum absorption (")

TABLE 2.5

SOUND ABSORPTION PERFORMANCE
OF EXAMPLE 2 FOAM WITH SKIN OFF FOAM

| Thickness of Specimen | Perforation Density[10] | Ave. Sound Abs. Coeff.[9] | Max[11] | $f_{max}$[12] |
|---|---|---|---|---|
| 50 mm | 0 | 0.43 | 0.50 | 400 |
|  | 1 | 0.58 | 0.95 | 630 |
| 35 mm | 0 | 0.38 | 0.61 | 630 |
|  | 1 | 0.48 | 0.89 | 800 |
| 25 mm | 0 | 0.33 | 0.62 | 1000 |
|  | 1 | 0.41 | 0.93 | 1250 |

[9,10,11&12]are defined above

The macrocellular foam is shown to absorb sound reasonably well as extruded and significantly better upon perforation.

What is claimed is:

1. A cellular thermoplastic polymer foam having an average cell size of at least about 1.5 mm, a density not greater than about 300 kg/m³, an average sound absorption coefficient of at least about 0.2, and a heat distortion temperature of at least about 110 degrees Celsius, wherein the thermoplastic polymer comprises:
    (A) at least one predominantly isotactic, propylene polymer having a tan δ value not greater than 1.5 and optionally
    (B) at least one ethylene polymer produced via a free radical process blended with the propylene polymer,
    wherein the thermoplastic polymer foam satisfies at least one of the following two conditions:
        the thermoplastic polymer comprises ethylene polymer blended with the propylene polymer and the weight ratio of the propylene polymer (A) to the ethylene polymer (B) is at least about 35:65 and/or
        the foam has at least one surface, the at least one surface having defined therein a multiplicity of perforation channels extending from the at least one surface into the foam such that there is an average of at least one perforation channel per 10 square centimeters of the at least one surface.

2. The foam of claim 1 having an open cell content of less than 50 percent measured according to ASTM D2856-A.

3. The foam of claim 2 having an open cell content not greater than 20 percent measured according to ASTM D2856-A.

4. The foam of claim 1 wherein the foam has the perforation channels and the perforation channels have an average diameter at the at least one surface of 0.1 mm.

5. The foam of claim 4 wherein the at least one surface has an average of at least 10 perforation channels per 10 square centimeters extending from the at least one surface into the foam.

6. The foam of claim 1 having an average cell size of at least about 5 mm and a density not greater than about 60 kg/m³.

7. The foam of claim 1 having an average sound absorption coefficient of at least about 0.3.

8. The foam of claim 1 having a heat distortion temperature of at least about 140 degrees Celsius.

9. The foam of claim 1 having a water absorption not more than 10 percent by volume measured according to European Norm 12088 at 50 degrees Celsius based on a test period of 14 days exposure.

10. The foam of claim 1, wherein the thermoplastic polymer comprises ethylene polymer blended with the propylene polymer and the ethylene polymer is selected from the group consisting of low density polyethylene (LDPE), ethylene-vinyl acetate copolymer (EVA), ethylene-ethyl acrylate copolymer (EEA), and ethylene-acrylic acid copolymer (EAA).

11. The foam of claim 1, wherein the propylene polymer has (1) a tan δ value not greater than 1.0, (2) a melt tension of at least 15 centiNewtons (cN), and/or (3) a melt strength of at least 25 centiNewtons (cN).

12. The foam of claim 1 wherein the propylene polymer has a branching index less than 0.9.

13. The foam of claim 1, wherein the propylene polymer comprises at least 90 weight-percent propylene monomer-derived units.

14. The foam of claim 10, wherein the at least one ethylene polymer is low density polyethylene.

15. The foam of claim 14, wherein the at least one surface has an average of at least 10 perforation channels per 10 square centimeters extending from the at least one surface into the foam.

16. The foam of claim 14, wherein the the weight ratio of the propylene polymer (A) to the ethylene polymer (B) is at least about 35:65.

17. The foam of claim 1 wherein the polymer foam has an average cell size of at least about 5 mm and a density not greater than 60 kg/m³.

18. The foam of claim 16, wherein the polymer foam has an average cell size of at least about 5 mm and a density not greater than 60 kg/m³.

19. The foam of claim 1, wherein the polymer foam has a density less than 25 kg/m³.

20. A process for making polymer foams useful for sound absorption in an elevated temperature and/or moist environment comprising converting a foamable composition comprising at least one blowing agent and at least one thermoplastic polymer blend into a cellular polymer foam having an average cell size of at least 1.5 mm, a density not greater than 300 kg/m³, and at least one surface, the thermoplastic polymer blend comprising:
    (A) at least one predominantly isotactic, propylene polymer having at least one of (1) a tan δ value not greater than 1.5, (2) a melt tension of at least 7 centiNewtons (cN), and/or (3) a melt strength of at least 10 centiNewtons (cN) blended with
    (B) at least one ethylene polymer produced via a free radical process, wherein the weight ratio of the propylene polymer (A) to the ethylene polymer (B) is at least 35:65.

21. A process for making polymer foams comprising:
    (A) providing a cellular polymer foam having an average cell size of at least 1.5 mm, a density not greater than 300 kg/m³, an average sound absorption coefficient of at least 0.2, a heat distortion temperature of at least 110 degrees Celsius, and at least one surface wherein the polymer comprises:
        (1) at least one predominantly isotactic, propylene polymer having at least one of a tan δ value not greater than 1.5, a melt tension of at least 7 centiNewtons (cN) and/or a melt strength of at least 10 centiNewtons (cN) and optionally
        (2) at least one ethylene polymer produced via a free radical process blended with the propylene polymer, and
    (B) perforating the at least one surface of the polymer foam of step (A) so as to form a multiplicity of perforation channels extending from the at least one surface into the foam such that there is an average of at least one perforation channel per 10 square centimeters (cm²) area of the at least one surface.

22. The process according to claim 20, wherein thepropylene polymer has a tan δ value not greater than 1.0, a melt tension of at least 15 centiNewtons (cN) and/or a melt strength of at least 25 centiNewtons (cN).

23. The process according to claim 21, wherein the perforation channels have an average diameter at the at least one surface of 0.1 mm.

24. The process according to claim 20, wherein thepropylene polymer has a branching index less than 0.9.

25. The process according to claim 21, wherein the at least one surface has an average of at least 10 perforation channels per 10 square centimeters extending from the at least one surface into the foam.

26. The process according to claim 20, wherein thepropylene polymer comprises at least about 90 weight-percent propylene monomer-derived units.

27. The process according to claim 21, wherein the polymer foam before perforation has an open cell content, measured according to ASTM D2856, Procedure A, not greater than about 40 percent and the polymer foam after perforation has an open cell content measured according to ASTM D2856, Procedure A, of at least 20 percent and at least 10 percent greater than the open cell content, measured according to ASTM D2856, Procedure A, of the polymer foam prior to perforation.

28. The process according claim 20, wherein the polymer foam has an average cell size of at least about 5 mm and a density not greater than about 60 kg/m³.

29. The process according to claim 21, wherein the polymer foam has an average cell size of at least about 5 mm and a density not greater than about 60 kg/m³.

30. The process according to claim 20, wherein the at least one ethylene polymer is selected from the group consisting of low density polyethylene (LDPE), ethylene-vinyl acetate copolymer (EVA), ethylene-ethyl acrylate copolymer (EEA), and ethylene-acrylic acid copolymer (EAA).

31. The process according to claim 21, wherein the at least one ethylene polymer is present in the polymer and is selected from the group consisting of low density polyethylene (LDPE), ethylene-vinyl acetate copolymer (EVA), ethylene-ethyl acrylate copolymer (EEA), and ethylene-acrylic acid copolymer (EAA).

32. The process according to claim 20, wherein the at least one ethylene polymer is low density polyethylene.

33. The process according to claim 21, wherein the polymer further comprises a substantially random interpolymer.

* * * * *